US009925643B2

(12) United States Patent
Weaver

(10) Patent No.: US 9,925,643 B2
(45) **Date of Patent: *Mar. 27, 2018**

(54) WOOD-BASED ABRASIVE BLASTING MEDIA

(71) Applicant: Fiber Resources, Inc., Pine Bluff, AR (US)

(72) Inventor: William R. Weaver, Pine Bluff, AR (US)

(73) Assignee: Fiber Resources, Inc., Pine Bluff, AR (US)

( * ) Notice: Subject to any disclaimer, the term of this patent is extended or adjusted under 35 U.S.C. 154(b) by 186 days.

This patent is subject to a terminal disclaimer.

(21) Appl. No.: 15/019,628

(22) Filed: Feb. 9, 2016

(65) Prior Publication Data

US 2016/0158917 A1 Jun. 9, 2016

Related U.S. Application Data

(63) Continuation-in-part of application No. 13/494,743, filed on Jun. 12, 2012, now Pat. No. 9,290,687.

(51) Int. Cl.

| | |
|---|---|
| ***C09K 8/035*** | (2006.01) |
| ***C09K 8/02*** | (2006.01) |
| ***B24C 11/00*** | (2006.01) |

(52) U.S. Cl.
CPC .............. *B24C 11/00* (2013.01); *C09K 8/035* (2013.01); *C09K 2208/08* (2013.01)

(58) Field of Classification Search
CPC ............................ C09K 8/035; C09K 2208/08
USPC .................................................. 507/104, 204
See application file for complete search history.

(56) References Cited

U.S. PATENT DOCUMENTS 2,749,308 A * 6/1956 Van Beckum ........ E21B 21/003 507/104
4,211,740 A * 7/1980 Dean ..................... B30B 11/201 264/115
4,324,561 A * 4/1982 Dean ..................... B30B 11/201 44/589
2007/0186822 A1* 8/2007 Utagaki .................. C04B 28/04 106/805
2009/0013603 A1* 1/2009 Rolland ................... C10J 3/466 48/209
2009/0064569 A1* 3/2009 Khater .................. B30B 11/228 44/589

* cited by examiner

*Primary Examiner* — Aiqun Li

(57) ABSTRACT

A wood-based blasting material is formed for introduction into a blasting fluid by mixing high-density pellet particles of various sizes. The pellet particles are formed from sawdust or fiber pressed under high pressure, resulting in brittle pellets. The pellets may then be crumbled and screened into particles of an appropriate size. The particles do not disassociate into their constituent materials when mixed with the blasting fluid, and thus maintain their density during use in the abrasive blasting process.

20 Claims, 1 Drawing Sheet

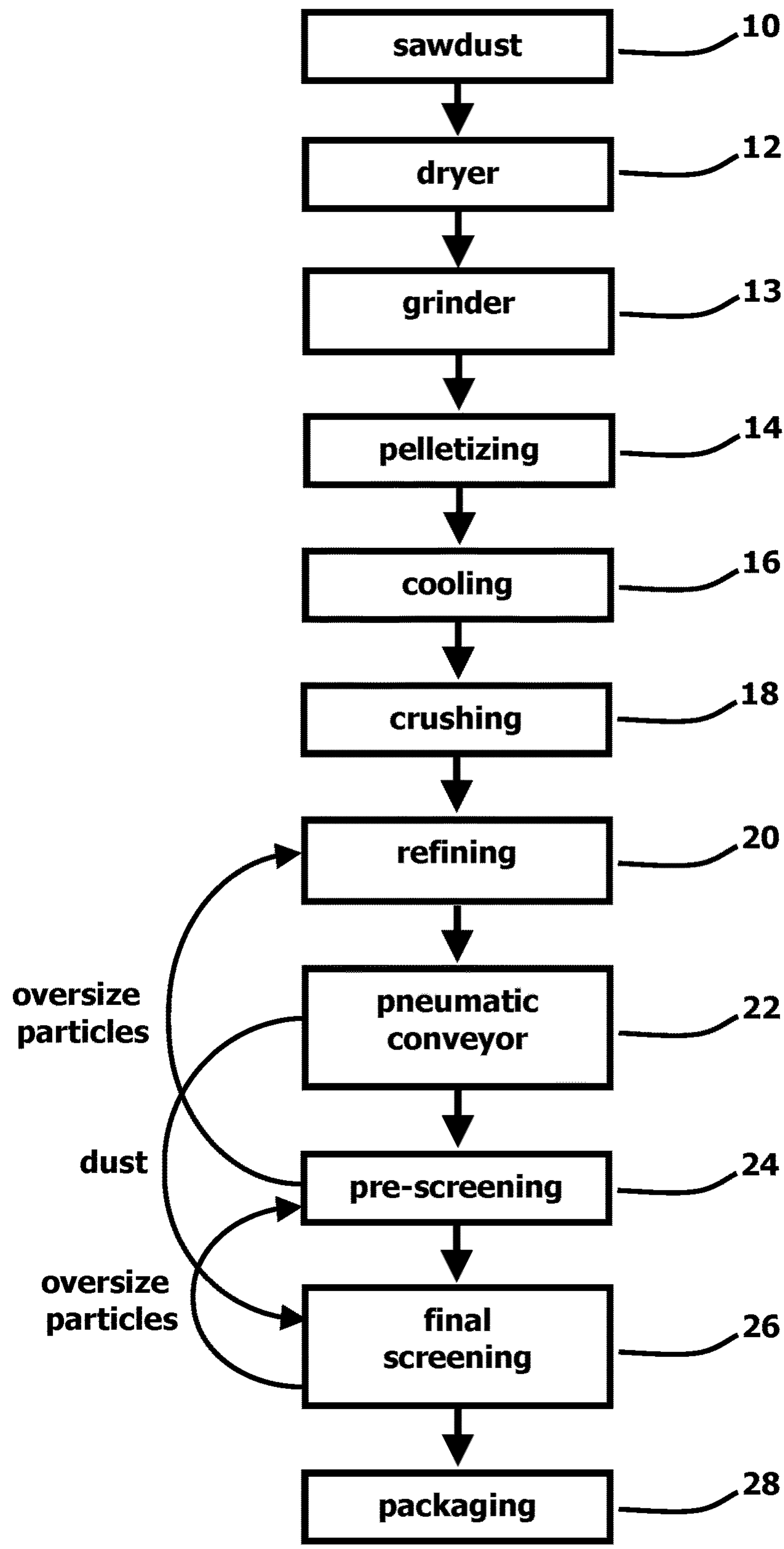
sawdust
10
dryer
12
grinder
13
pelletizing
14
cooling
16
crushing
18
refining
20
oversize particles
pneumatic conveyor
22
dust
pre-screening
24
oversize particles
final screening
26
packaging
28

WOOD-BASED ABRASIVE BLASTING MEDIA

CROSS-REFERENCE TO RELATED APPLICATIONS

This application is a continuation-in-part of, and claims the benefit to, U.S. patent application Ser. No. 13/494,743, entitled "Wood-Based Loss Circulation Material" and filed on Jun. 12, 2012. The complete disclosure of said patent application is hereby incorporated by reference.

STATEMENT REGARDING FEDERALLY SPONSORED RESEARCH OR DEVELOPMENT

Not applicable.

BACKGROUND OF THE INVENTION

The present invention relates to additives used in abrasive blasting, and more particularly to wood-based additives for fluid-based blasting systems.

Wood-based materials are used in a variety of industrial processes because the materials are environmentally safe and are available at low cost, typically sourced from chips and other leftovers from lumber manufacturing. Because of these advantages, finding additional applications for wood-based materials is highly desirable.

Abrasive blasting is the operation of forcibly propelling a stream of abrasive material against a surface under high pressure, typically used to remove surface corrosion or contaminants. A pressurized fluid (often air) is used to propel the blasting media (typically sand particles, beads, nutshells, etc.) toward the surface to be cleaned. Several types of blasting exist, including wet abrasive blasting, sand blasting, and bead blasting. In wet blasting, the media is introduced into a pressurized stream of water or other liquid. Sand blasting is possibly the most commonly known abrasive blasting technique, as sand used to be the most commonly used media introduced into the pressurized air system. Bead blasting, as can be guessed by its name, employs fine glass beads and is typically used in auto body work, as sand blasting tends to invite rust formation under painted surfaces. These types of applications, however, can cause damage to the surface, as sand, beads, and other types of existing blast media can cause divots in the surface as they propel toward the surface at high speeds.

The present invention overcomes the limitations of existing abrasive blasting technology, solves the problems identified with respect to the existing blast media, and presents certain advantages over the existing technology as set forth below.

BRIEF SUMMARY OF THE INVENTION

The present invention is directed to a wood-based blast media for use in an abrasive blasting system for the purpose of surface cleaning, and a method of forming such a material. The blast media is formed by employing very high pressures during the pelletizing process, wherein refined sawdust is reduced to high-density pellets. The resulting pellets are very brittle, and thus may be easily crumbed and screened into appropriate size groups for various abrasive blasting applications. The crumbles introduced into the blasting fluid, such as gas-, oil-, or mineral-based systems, do not appreciably break down into their constituent components while in the blasting fluid, and thus the blast media remains compact and intact when propelled at the surface, which results in a higher quality cleaning. Wood-based abrasives do not cause the damage that may be caused by sand- and bead-based blasting systems, and thus are desirable for a number of blasting applications where a more delicate surface is to be cleaned. In one non-limiting example, wood-based blasting systems may be used to clean outdoor wood furniture, decks, and porches; the crumbled wood pellets do not cause damage to the wood surface while cleaning the surface, and do not dig into the wood as sand or nut shells do. Furthermore, the crumbled wood pellets are environmentally neutral, and may be easily cleaned up with a blower or even a broom after use.

In one aspect of the present invention, the invention is directed to wood-based blast media for introduction into a pressurized blasting fluid, the material consisting essentially of wood fiber and a gas, an oil, and/or a mineral, wherein the material has a density suitable for blasting operations. Media density is a major factor in the energy the media can deliver to the surface on impact. Higher density media, although capable of greater surface cleaning, may result in damage to certain surfaces. Lower density media may require increased blasting velocity to compensate for the lack of material density, and increased velocity may also lead to surface damage. Thus a high-density wood-based blast media is generally desirable for most applications.

In another aspect of the present invention, the invention is directed to a method for manufacturing a wood-based blast media for introduction into a blasting fluid, wherein the material consists essentially of wood fiber and at least one of a gas, an oil, or a mineral, the method comprising the steps of drying a sawdust material to a desired moisture content, pelletizing the sawdust material to produce pellets, crumbling the pellets into smaller particles, screening the particles for size, and mixing particles of various sizes.

It is also an object of the present invention to provide for a crumbled pellet blast media that easily mixes with a desired blasting fluid without significantly disassociating into its constituent particles.

It is a further object of the present invention to provide for a blast media that is inexpensive to produce and transport.

It is a further object of the present invention to provide for a blast media that is compact when stored.

It is a further object of the present invention to provide for a blast media that is environmentally safe.

These and other features, objects and advantages of the present invention will become better understood from a consideration of the following detailed description of the preferred embodiments and appended claims in conjunction with the drawing as described following:

BRIEF DESCRIPTION OF THE SEVERAL VIEWS OF THE DRAWINGS

FIG. 1 is a flow chart illustrating the process for forming a wood-based blast media according to a preferred embodiment of the present invention.

DETAILED DESCRIPTION OF THE PREFERRED EMBODIMENT(S)

With reference to FIG. 1, a method of manufacturing a blast media according to a preferred embodiment of the present invention may be described.

The base material used in the manufacturing of the blast media according to a preferred embodiment of the present invention is hardwood sawdust or fiber. The material is acquired at step 10 of FIG. 1. This material is widely available at relatively low cost from lumber mills and like locations. Oak is the preferred hardwood material due to its acidity. While 100% hardwood sawdust or fiber is used in the preferred embodiment of the present invention, however, softwood sawdust or fiber, a blend of hardwood and softwood sawdust or fiber, or other wood-based materials may be used in alternative embodiments of the present invention. Examples include cedar fiber, and torrefied wood (which yields a hydrophobic product).

The hardwood sawdust or fiber is dried at step 12 of FIG. 1. Equipment for drying sawdust, fiber, and other wood-based materials is well known in the art. In the preferred embodiment, the sawdust or fiber is dried to the point where it is comprised of 10% to 14% moisture by weight, while it is believed to be ideal to dry the sawdust to about 11% moisture by weight. In alternative embodiments, more or less moisture may be retained in the dried sawdust. Retaining less moisture in the pellet will result in a denser pellet, so drying step 12 is an important factor in the density of the final product.

The dried sawdust or fiber is ground to a uniform particle size at step 13. The preferred particle size is less than 5 mesh, but larger or smaller particles may be employed in alternative embodiments of the present invention, or this step of creating a uniform particle size may be skipped altogether. A hammer mill is used in the preferred embodiment to reduce the wood particles to a uniform size, although other means may be used in alternative embodiments. The reduction of the wood particles to a uniform size is an aid to pelletization, as described below.

At step 14, the dried material is pelletized. Pellet mills and other machinery that may be used to form pellets from sawdust, wood fiber, and like materials are well known in the art. By controlling the amount of pressure applied during the pelletization process, the density of the resulting pelletized material may be controlled. In the preferred embodiment, the density of the resulting pelletized material is very high, in the range of about 75 pounds per cubic foot to about 85 pounds per cubic foot. (It may be noted that this is the actual pellet density, not the bulk density of the product when packaged, which will be lower.) A very high pressure of about 50,000 pounds per square inch is used in a pellet mill according to the preferred embodiment of the present invention in order to achieve this density. This density is intended to achieve a high quality cleaning process during use without damaging the surface upon impact during blasting or causing the impaction of material into softer surfaces, such as wood. In alternative embodiments, different pressures may be used in the pelletization process in order to produce pellets of different density in order to achieve the density necessary to clean a particular surface. The pressures used in this process are so high that the individual fiber cells in the pellets are crushed, such that the pellets are quite brittle and easily reduced in size (crumbled) without lowering the actual particle density.

The pellets according to a preferred embodiment are approximately ¼" in diameter. Other sizes, however, are within the scope of the invention. By lowering the diameter of the pellet, the surface area of the pellet (and, therefore, of the final crumbled material) will be increased. Surface area and geometry are believed by the inventor to play an important role in the functional parameters of the finished material.

The pelletization process results in a great deal of heat within the material being pelletized, particularly at the very high pressures employed with respect to the preferred embodiment of the present invention. This heat aids in the process of forming an integral pellet without the need to use additional binding agents. No binding agent other than the moisture already present in the material is necessary, although binders may be used in alternative embodiments. In addition, the heat and pressure cause the surface of the pellets to be thermomechanically changed through fluidization of the lignins in the wood. This heat and pressure also serves to sanitize the resulting wood pellets.

In the preferred embodiment, pellets resulting from the pelletization process of step 14 will have a temperature of about 300° Fahrenheit. The pellets must be cooled for further processing, and this cooling takes place at step 16 of FIG. 1. In the preferred embodiment, the pellets are cooled to ambient temperature at step 16. Cooling results in the loss of additional moisture within the pellets, so that in the preferred embodiment the pellets have a moisture content of only about 8% by weight after the cooling process of step 16. The cooled pellets may be stored for later use, or immediately conveyed for further processing. Optionally, the cooled pellets may be screened to remove any non-pellet material, such material then being returned to the feed stock of the pellet mill at step 14.

At step 18 of FIG. 1 the cooled pellets are crushed or crumbled into smaller particles. In the preferred embodiment of the present invention this step may be performed using a roller mill or pellet crumbler, both of which are well known in the art. Examples include single or double pairs of rollers in stacked crumble roller mills. The crushing or crumbling of the pellets may be performed in any number of other ways in alternative embodiments of the present invention.

The crumbled pellets are then metered into a disk refiner or attrition mill at refining step 20. Disk refiners and attrition mills are well known in the art. In the preferred embodiment, an Andritz Sprout-Bauer attrition mill model DM-24 is used to perform this step, driven by a 50 horsepower motor and using a set of "G" patterned refining plates. Other equipment may be substituted in alternative embodiments of the present invention. The purpose of this step is to cut the particles in order to provide further reduction in particle size, without fluffing or fraying of the individual wood fibers in the particles. Fluffing or fraying would serve to lower the overall density of the resulting particles and should therefore be avoided.

At step 22, the refined particles are delivered to a pneumatic conveyor system. Pneumatic conveyors use pipes or ducts that carry a mixture of materials with a stream of air. Small, relatively dry particles such as those that are delivered from the refiner at step 20 according to the preferred embodiment of the present invention may be easily moved by means of pneumatic conveying systems. Numerous pneumatic conveying systems, including both vacuum systems and positive pressure systems, are known in the art. In the preferred embodiment of the present invention, the pneumatic conveyor serves not only to move the particles to the next step in manufacturing, but also provides additional cooling of the particles, which is desirable for further processing. In the preferred embodiment, the particles are cooled from a temperature of about 200 to 300° Fahrenheit when leaving the refiner to about ambient temperature at the end of the pneumatic conveyor. This results in further moisture loss in the material, such that the resulting material has a moisture by weight content of less than 8%, preferably in the range of 4% to 8% moisture by weight. In addition, the use of a pneumatic conveyor provides a means of removing the ultra-fine dust and particulate that has been generated by processing up to this point. Removal of the ultra-fine dust and particulate also reduces the risk of fire or explosion that would result if the particulate-air stream were to be exposed to a spark or flame.

At step 24 of FIG. 1, the particles emerging from the pneumatic conveyor are pre-screened to ensure that they are no larger than a set size. In the preferred embodiment, a screen size of 10 mesh is used to capture the oversized particles, although other sizes could be used in alternative embodiments. Those particles that are too large to fit through the screen are returned to the refiner at refining step 20 for further size reduction. These particles, which cannot pass through the 10 mesh screen, are those that are larger than about 0.0787 inches in diameter.

Those particles that pass through the pre-screening process at step 24 are passed to the final screening at step 26. In the preferred embodiment, three different screen sizes are employed in order to produce crumbled particles that fall into three different grades: coarse, medium, and fine. Coarse particles are those that do not pass through a screen of 18 mesh size. This corresponds to particles larger than about 0.0394 inches in diameter. These coarse particles may then be conveyed away for separate storage. The particles that pass through the 18 mesh size screen are then introduced to a screen at 60 mesh size, and those that do not pass through are deemed the "medium" particles. They may also be conveyed away for separate storage. These particles are those that are larger than about 0.0098 inches in diameter. Those that pass through the 60 mesh size screen are passed to a screen of 200 mesh size. Those that do not pass through are deemed the "fine" particles. These particles are those larger than about 0.0029 in diameter. These fine particles can be stored in a separate location for use in other applications, as they may not be suitable for blasting operations. The very fine particular material or dust that passes through the 200 mesh screen may be sent to a bag house. It may be noted that in the case where there is an excess of coarse or medium particles, these may be returned to refining step 20 in order to reduce their size, whereby a larger quantity of the medium and fine particles will be passed upon the process being repeated.

In step 28, the particles resulting from this process may be packaged for shipment, in a manner as known in the art. The discrete particle sizes may be collected in bins, and then bagged discretely. Alternatively, the course and medium sizes may be mixed in specified proportions in order to produce a custom blended product for various unique blasting applications.

The finished product resulting from this process will be a collection of crumbled pellets in graded sizes. In the case of a 100% oak product, the approximate bulk density of the crumbles will be about 22 to 27 pounds per cubic foot for the fine particles, about 29 to 32 pounds per cubic foot for the medium particles, and about 30 to 34 pounds per cubic foot for the coarse particles. Again referring to the case where the crumbles are 100% oak, the crumbles will be dark to light tan in color, the color being lighter for the smaller particles. The specific gravity will also vary somewhat with particle size, with the finer particles being lower in specific gravity. In the preferred embodiment, the coarse/medium particles vary within a specific gravity range of about 1.1 to 1.3. This is seen as an ideal range for various blasting fluids, such that custom mixing of the sizes may result in a formulation with a specific gravity that precisely matches that most desirable in a blasting fluid used in a particular application. It may be noted that due to the cutting/shearing action by which the particles are manufactured, their appearance will be well defined, and not frayed. It is believed by the inventor that this aspect of the crumbled pellets is a factor in the action of the crumbles to substantially remain integral when presented into blasting fluid, rather than disassociating into their constituent fibers, but the invention is not intended to be limited by this theory.

The steps in using the finished product resulting from the manufacturing process of FIG. 1 according to a preferred embodiment of the present invention may now be described. The user may choose to use the coarse, the medium, or a mixture of the coarse and medium particle material depending upon the application. It is believed that the fine particles are not suited for use in blasting applications as particles smaller than 0.0098 inches will not have the mass to provide quality blasting. These fine particles may be sold as is or mixed with one or more of the coarse and medium size grades for use in other applications.

The medium and coarse particles produced according to this method have numerous advantages when employed in blasting fluid. For one example, they have been found to be advantageous when abrasive blasting wood products including wooden benches, decks, porches, or log homes. Additionally, the particles produced according to this method can be used in an air blast system without digging into or creating divots in the product being cleaned. Furthermore, the particles produced according to this method are an environmentally neutral product and are easier to clean up following a job. Finally, when the fluid with which the particles are mixed is either a gas such as air or an oil, the crumbled particles will not re-hydrate or break down in the fluid, and thus will retain their particle density. Water is seen as a less desirable fluid for use with the particles, since the particles may re-hydrate in the presence of water and thus lose density. It is believed that softwood particles are more prone to re-hydration than hardwood particles, with, for example, pine-based particles soaking up water at approximately three times the rate of oak-based particles.

As used herein, "comprising" is synonymous with "including," "containing," or "characterized by," and is inclusive or open-ended and does not exclude additional, unrecited elements or method steps. As used herein, "consisting of" excludes any element, step, or ingredients not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

When a Markush group or other grouping is used herein, all individual members of the group and all combinations and subcombinations possible of the group are intended to be individually included in the disclosure. When a range is stated herein, the range is intended to include all subranges within the range and all discrete points within the range.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Thus, additional embodiments are within the scope of the invention and within the following claims.

In general the terms and phrases used herein have their art-recognized meaning, which can be found by reference to standard texts, journal references and contexts known to those skilled in the art. The preceding definitions are provided to clarify their specific use in the context of the invention.

The present invention has been described with reference to certain preferred and alternative embodiments that are intended to be exemplary only and not limiting to the full scope of the present invention as set forth in the appended claims.

The invention claimed is:

1. A blast media for introduction into a fluid, the blast media comprising a plurality of crumbled pellet particles of a plurality of grades, the crumbled pellet particles consisting essentially of wood fiber and moisture without an additional binder material, wherein each of said crumbled pellet particles comprises a particle diameter, further wherein said plurality of grades comprises a coarse particle grade and a medium particle grade, wherein said particle diameter of said crumbled pellet particles of said coarse particle grade is greater than 0.0394 inches, further wherein said particle diameter of said crumbled pellet particles of said medium particle grade is between 0.0098 inches and 0.0394 inches, wherein the crumbled pellet particles have a specific gravity greater than 1.0, and further wherein the crumbled pellet particles function to remain substantially integral when mixed with the fluid.

2. The blast media of claim 1, wherein said wood fiber consists essentially of hardwood wood fiber.

3. The blast media of claim 2, wherein said wood fiber consists essentially of oak wood fiber.

4. The blast media of claim 1, wherein the specific gravity of the crumbled pellet particles is in the range of 1.1 to 1.3.

5. The blast media of claim 1, wherein the moisture comprises 4 to 8% of the crumbled pellet particles by weight.

6. The blast media of claim 1, wherein said fluid comprises air.

7. The blast media of claim 1, wherein said fluid comprises a liquid.

8. The blast media of claim 7, wherein said fluid comprises water.

9. A method for manufacturing a blast media for introduction into a blasting fluid, said blast media consisting essentially of wood and one or more of air and water, said method comprising the steps of:

a. drying a wood source material to a desired moisture content;

b. pelletizing the source material to produce a plurality of pellets, wherein the specific gravity of the plurality of pellets is greater than 1.0;

c. crumbling the pellets into smaller crumbled pellet particles, wherein said crumbled pellet particles comprise a particle diameter;

d. screening the crumbled pellet particles through a plurality of mesh screens to produce a plurality of crumbled pellet particle size grades, wherein said plurality of mesh screens comprise an 18 mesh size screen, and a 60 mesh size screen, further wherein said crumbled pellet particle size grades comprise a coarse particle grade and a medium particle grade, wherein said particle diameter of said crumbled pellet particles of said coarse particle grade is greater than 0.0394 inches, further wherein said particle diameter of said crumbled pellet particles of said medium particle grade is between 0.0098 inches and 0.0394 inches, to produce a plurality of crumbled pellet particle size grades, further wherein said crumbled pellet particles of said coarse particle grade are captured by said 18 mesh size screen, further wherein said crumbled pellet particles of said medium particle grade pass through said 18 mesh size screen and are captured by said 60 mesh size screen; and e. mixing the crumbled pellet particles of said coarse size grade and the crumbled pellet particles of said medium size grade to produce a proportional mixture of crumbled pellet particle grades.

10. The method of claim 9, wherein said drying step comprises the step of drying the source material to 10% to 14% moisture content by weight.

11. The method of claim 10, further comprising the step of grinding the source material to a uniform size prior to the pelletizing step.

12. The method of claim 11, wherein the pellets produced in the pelletizing step comprise a bulk density in the range of 22 pounds per cubic foot to 34 pounds per cubic foot.

13. The method of claim 12, wherein the screening step further comprises the step of returning any oversized crumbled pellet particles to the crumbling step.

14. A blasting fluid comprising a mixture of a liquid comprising at least one of a gas, an oil or a mineral with a plurality of crumbled pellet particles of a plurality of grades, the crumbled pellet particles consisting essentially of wood fiber and moisture without an additional binder material, wherein each of said crumbled pellet particles comprises a particle diameter, further wherein said plurality of grades comprises a coarse particle grade and a medium particle grade, wherein said particle diameter of said crumbled pellet particles of said coarse particle grade is greater than 0.0394 inches, further wherein said particle diameter of said crumbled pellet particles of said medium particle grade is between 0.0098 inches and 0.0394 inches, wherein the crumbled pellet particles have a specific gravity greater than 1.0, and further wherein the crumbled pellet particles function to remain substantially integral when mixed with the liquid.

15. The blasting fluid of claim 14, wherein said wood fiber consists essentially of hardwood wood fiber.

16. The blasting fluid of claim 15, wherein said wood fiber consists essentially of oak wood fiber.

17. The blasting fluid of claim 14, wherein the specific gravity of the crumbled pellet particles is in the range of 1.1 to 1.3.

18. The blasting fluid of claim 14, wherein the moisture comprises 4 to 8% of the crumbled pellet particles by weight.

19. The blasting fluid of claim 14, wherein the at least one of a gas, an oil or a mineral consists essentially of a gas.

20. The blasting fluid of claim 19, wherein said gas consists essentially of air.

* * * * *